Feb. 22, 1955   E. D. BROWN   2,702,454
TRANSITION PIECE PROVIDING A CONNECTION BETWEEN
THE COMBUSTION CHAMBERS AND THE TURBINE
NOZZLE IN GAS TURBINE POWER PLANTS
Filed June 7, 1951   2 Sheets-Sheet 2
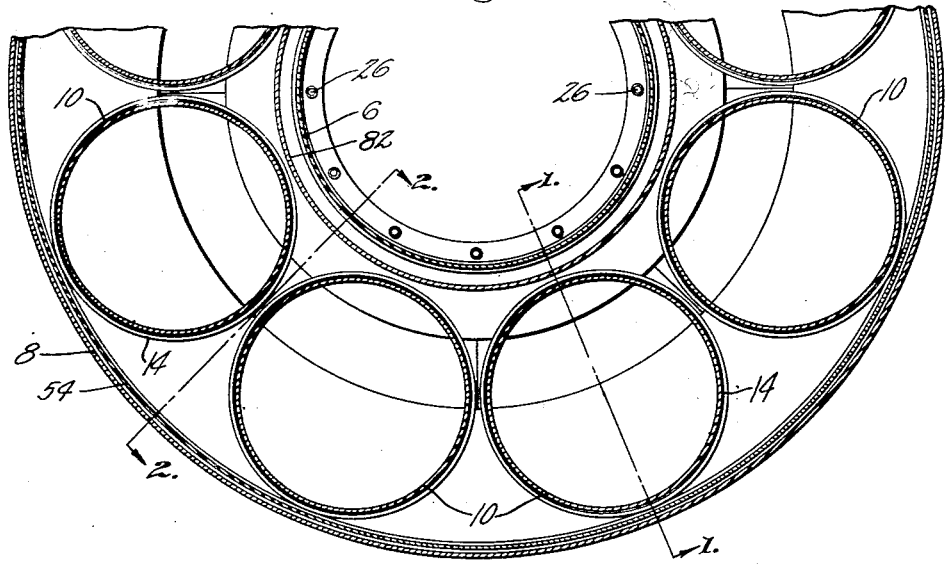
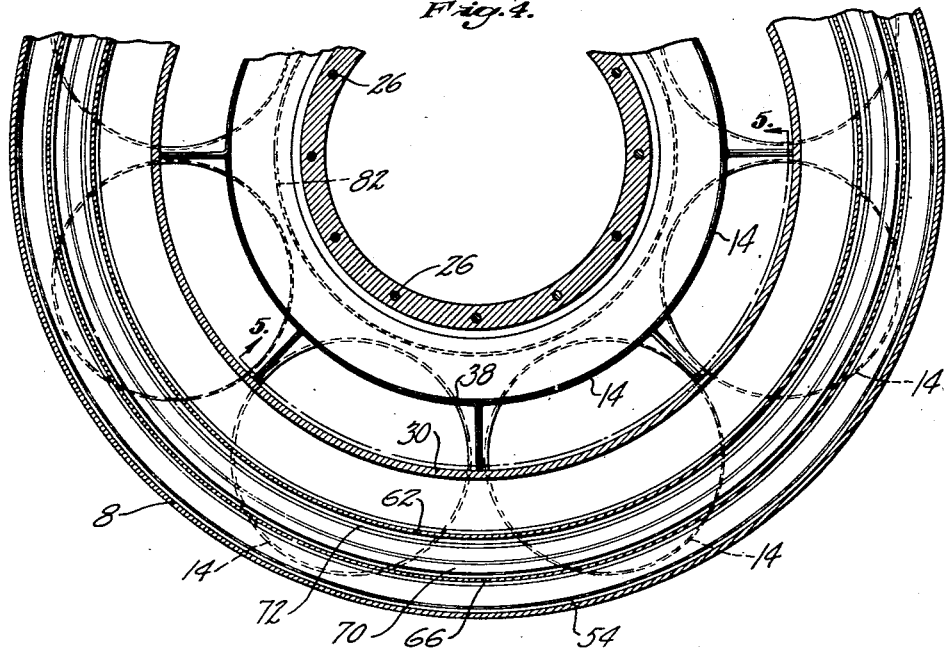

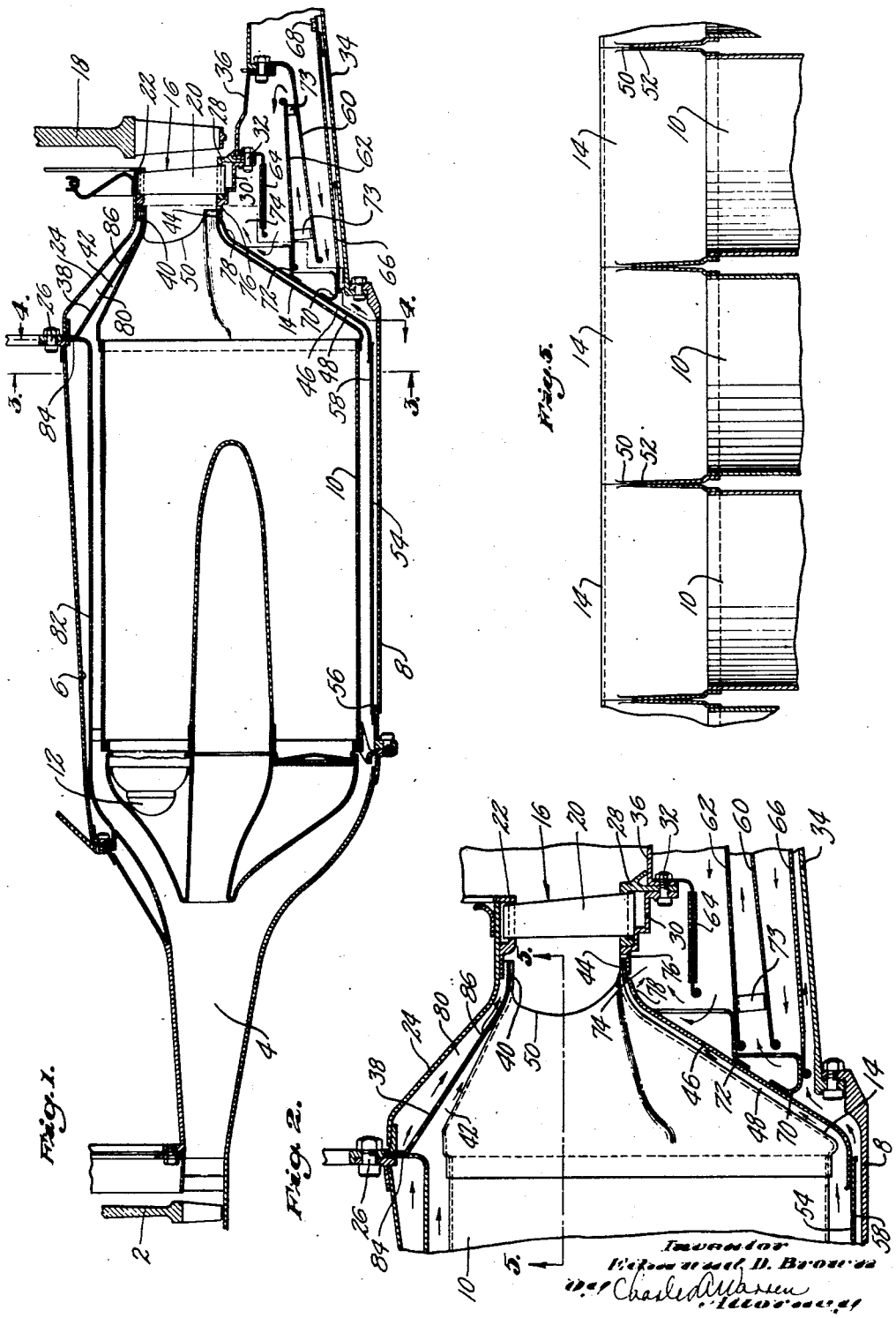

United States Patent Office 2,702,454
Patented Feb. 22, 1955

2,702,454

TRANSITION PIECE PROVIDING A CONNECTION BETWEEN THE COMBUSTION CHAMBERS AND THE TURBINE NOZZLE IN GAS TURBINE POWER PLANTS

Edmund D. Brown, Manchester, Conn., assignor to United Aircraft Corporation, East Hartford, Conn., a corporation of Delaware Application June 7, 1951, Serial No. 230,366

23 Claims. (Cl. 60—39.31)

The present invention relates to gas turbine power plants and particularly to the transition piece between the flame tubes of the combustor and the turbine nozzle.

One of the problems in this section of the power plant is the differential expansion that takes place between the parts during operation of the power plant. A feature of the present invention is an arrangement for constructing and supporting the transition piece to minimize any stresses resulting from the thermal expansion.

Since this portion of the power plant is one of the hottest sections, it has been found advantageous to cool the surfaces to some extent in order that they may have a longer useful life before need for replacement. A feature of the invention is an arrangement for cooling the surfaces with a selected amount of cooling air.

Because of the differential expansion between the parts it is difficult to maintain any clearances between the parts sufficiently close to maintain the gas leakage at the desired amount. One of the principal features of this invention is an arrangement for connecting the transition piece to the turbine nozzle in such a way that the leakage at this point may be accurately controlled so that the amount of air from the compressor used in this way will be maintained at the desired minimum.

Other objects and advantages will be apparent from the specification and claims, and from the accompanying drawings which illustrate an embodiment of the invention.

Fig. 1 is a longitudinal sectional view through a part of the power plant showing the flame tube and transition piece in section along the line 1—1 of Fig. 3.

Fig. 2 is a fragmentary view similar to a part of Fig. 1 but showing the connector tube between the individual flame tube and turbine nozzle in elevation, this view being taken substantially along the line 2—2 of Fig. 3.

Fig. 3 is a transverse sectional view substantially along the line 3—3 of Fig. 1.

Fig. 4 is a sectional view similar to Fig. 3 but along the line 4—4 of Fig. 1.

Fig. 5 is a developed sectional view along the line 5—5 of Figs. 2 and 4.

In the arrangement shown, a compressor, represented diagrammatically by a fragmentary portion 2 of the last compressor stage, delivers air to an annular duct 4 having an inner wall 6 and an outer wall 8. Within this duct are located a plurality of flame tubes 10 into which fuel through nozzles 12 is injected and in which the fuel mixed with air from the compressor is burned. Gas from the flame tube is delivered through duct extensions 14 to the turbine nozzle 16. The turbine includes a turbine rotor 18, a fragmentary part of which is shown. The compressor and turbine rotors are connected together to operate as a unit.

The turbine nozzle is made up of a number of turbine vanes 20 supported at their inner ends by an inner ring 22 which is secured as by welding to a truncated conical member 24 forming a part of the load-carrying structure of the power plant and secured as by bolts 26 to the downstream end of the inner wall 6 of the annular duct. At their outer ends, the turbine vanes 20 are supported by an outer supporting ring 28, the vanes being held in radial position by a second ring 30 held as by bolts 32 to the ring 28 and engaging with the outer ends of the vanes, as best shown in Fig. 2.

The outer wall 8 of the annular duct is also a part of the load-carrying structure of the power plant and has bolted thereto at its downstream end a ring 34 which is also bolted to a turbine casing 36. This casing 36 is attached as by the bolts 32 to rings 28 and 30 thereby supporting these rings. With this arrangement it will be apparent that the inner and outer vane supporting rings are rigidly supported with respect to the load-carrying structure of the power plant.

Each of the duct extensions 14 which form a part of the transition piece between the flame tubes and the turbine nozzle is substantially circular at its upstream end as best shown in Fig. 3 and is arranged to fit over and have a sliding connection with the downstream end of the flame tube 10. From this circular shape the duct extension converges, in a downstream direction, and becomes, at a point adjacent to the nozzle, substantially a sector of an annulus, as best shown in Fig. 4. Thus, when the several duct extensions from the flame tubes are assembled together in a ring, the downstream ends of the extensions will form an annulus corresponding substantially in dimension to the turbine nozzle. For supporting the duct extensions a frustoconical supporting ring 38 is attached as by a line of welding 40 to the inner surfaces of the duct extensions at their downstream end. The other end of the ring 38 is clamped between the end of the duct wall 6 and the ring 24 thereby providing at this point a direct connection to the load-carrying structure of the power plant. It will be noted that the conical ring 38 is arranged to diverge from the wall of the tube extension in an upstream direction to define an air path 42 therebetween, this path gradually diminishing in width in a downstream direction.

The outer surfaces of the duct extensions adjacent the turbine nozzle are welded as at 44 to the ring 30 so that the duct extensions are securely attached at this point. The duct extensions are surrounded by a frustoconical shield or member 46 which may be held by the same weld 44. This shield 46 diverges from the duct extensions in an upstream direction thereby defining an air path 48 similar to the air path 42 only located on the outside of the ring formed by the duct extensions.

Where the sector-shaped ends of the adjacent duct extensions are in contact with one another the walls are cut back as shown at 50 to reduce the turbulent flow of air adjacent to the turbine nozzle which might otherwise result. These adjacent walls are also welded together as at 52 to form a tight connection.

At the upstream end the shield 46 has sliding engagement with a shield 54 located just within and spaced from the outer wall 8 of the annular duct. Cooling air passes through holes 56 at the upper end of this shield to provide a flow of cooling air between the shield and the outer duct wall and additional cooling air may, if desired, enter this space adjacent the downstream end through other holes 58. This cooling air flows in a circuitous path over a series of baffles 60, 62 and 64 and a shield 66 positioned just within and spaced from the ring 34.

The shield 66 may be supported at its downstream end as by bolts 68 so that it will extend in spaced relation to the ring and engage at its upstream end with a sheet metal ring 70 secured to the ring 46. The adjacent baffles 60 and 62 may be supported from the turbine casing as shown with the baffle 62 engaging a supporting ring 72 on ring 46 similar to the ring 70. The baffles 60 and 62 are spaced apart by spacing clips 73. The innermost baffle 64 may be supported as by being bolted for example to the turbine casing.

With the arrangement shown, the air flowing around the heat shield and baffles in the direction of the arrows ultimately reaches the space 74 surrounding the supporting ring 30 and enters the gas path just upstream of the turbine vanes through a number of openings 76 in the ring 30 adjacent to the welds 44. Air in the air space 48 enters the chamber 74 through a number of spaced holes 78 in the ring 46 adjacent to its downstream end. The row of holes 76 is preferably made of such a size as to admit the desired amount of air therethrough in order to control the quantity of air flowing through space 48 and around the baffles.

At the inner end of the turbine vanes the point of attachment of the duct extensions 14 to the ring 38 is spaced somewhat from the inner nozzle ring 22 in order to provide for relative expansion and also to permit a flow of air from the space 42 as well as a similar space 80 between the rings 38 and 24. Air flowing through the annular duct between the inner wall 6 and an adjacent cylindrical shield 82 enters the space 80 through a number of holes 84 which are preferably of such a dimension as to meter the desired amount of cooling air. The ring 38 also has a number of metering holes 86 adjacent the downstream end for determining the quantity of air flowing through the cooling space 42.

With this arrangement the transition piece, which consists of the ring 38, the duct extensions 14, the ring 46 and the ring 30, is securely located within the power plant by the outer upstream edge of the ring 38 and by the outer nozzle ring 30 and is otherwise free to expand or contract as a result of temperature changes in the power plant. The arrangement is such that there are no abnormal stresses developed during power plant operation and the space provided for air leakage between the inner ring 38 and the nozzle ring 22 may vary substantially in dimension without affecting the amount of cooling air flowing there through since the cooling air is metered upstream of this point in the cooling air path.

It is to be understood that the invention is not limited to the specific embodiment herein illustrated and described, but may be used in other ways without departure from its spirit as defined by the following claims.

I claim:

1. In a gas turbine power plant, a plurality of substantially parallel flame tubes, an annular duct for said tubes, and a turbine inlet nozzle ring concentric to the duct, in combination with a transition piece extending from the flame tubes located in the annular duct to the turbine inlet nozzle ring concentric to the duct, said duct having inner and outer walls, said transition piece including a ring-shaped frusto-conical member adapted to extend from one of said walls to the nozzle ring, a plurality of duct extensions which are substantially cylindrical at one end and which converge to a segment shaped opening at the other end, said duct extensions being secured together to form a ring shape, and said extensions being secured at their segment shaped ends to one end of said ring-shaped member, the latter being substantially co-extensive axially with said extensions.

2. In a gas turbine power plant, a plurality of substantially parallel flame tubes, an annular duct for said tubes, and a turbine inlet nozzle ring concentric to the duct, in combination with a transition piece extending from the flame tubes located in the annular duct to the turbine inlet nozzle ring concentric to the duct, said duct having inner and outer walls, said transition piece including a ring-shaped frusto-conical member adapted to extend from one of said walls to the nozzle ring, a plurality of duct extensions which are substantially cylindrical at one end and which converge to a segment shaped opening at the other end, said duct extensions being secured together to form a ring shape, and said extensions being secured at their segment shaped ends to one end of said ring-shaped member, the opposite end of said ring-shaped member being adapted to be secured to one of the walls of the duct, the ring-shaped member being substantially co-extensive axially with said extensions.

3. In a gas turbine power plant, a plurality of substantially parallel flame tubes, an annular duct for said tubes, and a turbine inlet nozzle ring concentric to the duct, in combination with a transition piece extending from the flame tubes located in the annular duct to the turbine inlet nozzle ring concentric to the duct, said duct having inner and outer walls, said transition piece including a frusto-conical ring-shaped member extending from one of said walls to the nozzle ring, a plurality of duct extensions which are substantially cylindrical at the upstream end to correspond with the shape of the flame tubes and which converge to a segment shaped opening corresponding substantially to a segment of the nozzle ring, said duct extensions being secured together to form a ring shape, and said extensions being secured at their segment shaped ends to the turbine end of said ring-shaped member, the turbine end of said ring-shaped member being spaced from the adjacent nozzle ring to provide a gas path therebetween.

4. In a gas turbine power plant, a plurality of substantially parallel flame tubes, an annular duct for said tubes, and a turbine inlet nozzle ring concentric to the duct, in combination with a transition piece extending from the flame tubes located in the annular duct to the turbine inlet nozzle ring concentric to the duct, said duct having inner and outer walls, said transition piece including a ring-shaped member adapted to extend from one of said walls to the nozzle ring, a plurality of duct extensions which are substantially cylindrical at one end and which converge to a segment shaped opening at the other end, said duct extensions being secured together to form a ring shape, and said extensions being secured at their segment shaped ends to one end of said ring-shaped member, said duct extensions surrounding said ring-shaped member and said ring-shaped member being substantially co-extensive axially with said extensions and extending in diverging relation to the adjacent surfaces of the duct extensions from said one end thereof.

5. In a gas turbine power plant, a plurality of substantially parallel flame tubes, an annular duct for said tubes, and a turbine inlet nozzle ring concentric to the duct, in combination with a transition piece extending from the flame tubes located in the annular duct to the turbine inlet nozzle ring concentric to the duct, said duct having inner and outer walls, said transition piece including a ring-shaped member adapted to extend from one of said walls to the nozzle ring, a plurality of duct extensions which are substantially cylindrical at one end and which converge to a segment shaped opening at the other end, said duct extensions being secured together to form a ring shape, and said extensions being secured at their segment shaped ends to one end of said ring-shaped member, said duct extensions surrounding said ring-shaped member and a second ring-shaped member surrounding said duct extensions and being secured to the segment shaped ends of said duct extensions.

6. In a gas turbine power plant, a plurality of substantially parallel flame tubes, an annular duct for said tubes, and a turbine inlet nozzle ring concentric to the duct, in combination with a transition piece extending from the flame tubes located in the annular duct to the turbine inlet nozzle ring concentric to the duct, said duct having inner and outer walls, said transition piece including a ring-shaped member adapted to extend from one of said walls to the nozzle ring, a plurality of duct extensions which are substantially cylindrical at one end and which converge to a segment shaped opening at the other end, said duct extensions being secured together to form a ring shape, and said extensions being secured at their segment shaped ends to one end of said ring-shaped member, said duct extensions surrounding said ring-shaped member, and a second ring-shaped member surrounding said duct extensions and being secured to the segment shaped ends of said duct extensions, said last mentioned ring-shaped member extending in diverging relation to the adjacent surfaces of the duct extensions in a direction away from segment shaped ends of the extensions.

7. In a gas turbine power plant, a number of substantially parallel flame tubes, an annular duct having inner and outer walls for said tubes, and a turbine nozzle having inner and outer nozzle rings and vanes extending between said rings, in combination with a transition piece extending from the number of substantially parallel flame tubes to the turbine nozzle, the transition piece including a number of duct extensions one for each flame tube, each extension being substantially the shape and dimension of the flame tube at its upper end and tapering to a sector of an annulus at its downstream end adjacent to the turbine nozzle, said duct extensions being arranged in side by side relation to form an annulus, a conical member surrounding and secured at one edge to said extensions at their downstream segmental shaped ends, and the other edge of said member being secured to the outer wall of the duct for positioning the transition piece.

8. In a gas turbine power plant, a number of substantially parallel flame tubes, an annular duct having inner and outer walls for said tubes, and a turbine nozzle having inner and outer nozzle rings and vanes extending between said rings, in combination with a transition piece extending from the number of substantially parallel flame tubes to the turbine nozzle, the transition piece including a number of duct extensions one for each flame tube, each extension being substantially the shape and dimension of the flame tube at its upper end and tapering to a sector of an annulus at its downstream end adjacent to the turbine nozzle, said duct extensions being arranged in side by side relation to form an annulus, a conical member surrounding and secured at one edge to said extensions at their downstream segmental shaped ends, and a second member located within the annulus and secured to said extensions adjacent their downstream ends.

9. In a gas turbine power plant, a plurality of substantially parallel flame tubes, an annular duct for said tubes, and a turbine inlet nozzle concentric to the duct, in combination with a transition piece extending from the number of substantially parallel flame tubes in the annular duct to the turbine nozzle having inner and outer nozzle rings and vanes extending substantially radially between said rings, the transition piece including a number of duct extensions one for each flame tube, each extension being substantially the shape and dimension of the flame tube at its upper end and tapering to a sector of an annulus at its downstream end adjacent to the turbine nozzle, said duct extensions being arranged in side by side relation to form an annulus, a conical member surrounding and secured to said extensions at their downstream ends, and a second member located within the annulus and secured to said extensions adjacent their downstream ends, one of said members being adapted to be secured to the adjacent nozzle ring.

10. In a gas turbine power plant, a plurality of substantially parallel flame tubes, an annular duct for said tubes, and a turbine inlet nozzle concentric to the duct, in combination with a transition piece extending from the number of substantially parallel flame tubes in the annular duct to the turbine nozzle having inner and outer nozzle rings and vanes extending substantially radially between said rings, the transition piece including a number of duct extensions one for each flame tube, each extension being substantially the shape and dimension of the flame tube at its upper end and tapering to a sector of an annulus at its downstream end adjacent to the turbine nozzle, said duct extensions being arranged in side by side relation to form an annulus, a conical member surrounding and secured to said extensions at their downstream ends, and a second member located within the annulus and secured to said extensions adjacent their downstream ends, one of said members being adapted to be secured to the adjacent nozzle ring, said members extending in overlapping relation to said extensions and diverging therefrom in an upstream direction to define a cooling air space therebetween.

11. In a gas turbine power plant, a plurality of substantially parallel flame tubes, an annular duct for said tubes, and a turbine inlet nozzle concentric to the duct, in combination with a transition piece extending from the number of substantially parallel flame tubes in the annular duct to the turbine nozzle having inner and outer nozzle rings and vanes extending substantially radially between said rings, the transition piece including a number of duct extensions one for each flame tube, each extension being substantially the shape and dimension of the flame tube at its upper end and tapering to a sector of an annulus at its downstream end adjacent to the turbine nozzle, said duct extensions being arranged in side by side relation to form an annulus, a conical member surrounding and secured to said extensions at their downstream ends, and a second member located within the annulus and secured to said extensions adjacent their downstream ends, one of said members being adapted to be secured to the adjacent nozzle ring and the other of said members being spaced from the other nozzle ring to provide a gas path therebetween.

12. In a gas turbine power plant, a plurality of substantially parallel flame tubes, an annular duct for said tubes, and a turbine inlet nozzle concentric to the duct, in combination with a transition piece extending from the number of substantially parallel flame tubes in the annular duct to the turbine nozzle having inner and outer nozzle rings and vanes extending substantially radially between said rings, the transition piece including a number of duct extensions one for each flame tube, each extension being substantially the shape and dimension of the flame tube at its upper end, each extension being adapted to fit over and have sliding engagement with the end of the flame tube, each extension tapering to a sector of an annulus at its downstream end adjacent to the turbine nozzle, said duct extensions being arranged in side by side relation to form an annulus, a conical member surrounding and secured to said extensions at their downstream ends, and said member having attaching means at its edge remote from the attachment to the extensions by which said member is adapted to be secured to the adjacent structure for positioning the transition piece.

13. In a gas turbine power plant, a compressor, a turbine including a nozzle in the form of a ring, an annular duct having inner and outer walls and defining a path for gas from the compressor outlet to the turbine nozzle, a number of parallel substantially cylindrical flame tubes in said duct into which fuel is injected and in which the fuel mixed with the gas is burned, said tubes being substantially parallel to the axis of the duct, and a transition piece for delivering gas from the downstream ends of the flame tubes to the turbine nozzle, said transition piece including a truncated conical element extending from one of said walls to a point adjacent to the nozzle, a number of tube extensions which are substantially circular at their upstream ends and the shape of a sector of an annulus at their downstream ends, said extensions being secured together in a ring on one side of the conical element in side by side relation to define at their downstream ends a substantially annular opening corresponding in dimension to the nozzle, and means for securing said tube extensions to the nozzle ring on the side of the annular opening remote from the conical element.

14. In a gas turbine power plant, a compressor, a turbine including a nozzle in the form of a ring, an annular duct having inner and outer walls and defining a path for gas from the compressor outlet to the turbine nozzle, a number of parallel substantially cylindrical flame tubes in said duct into which fuel is injected and in which the fuel mixed with the gas is burned, said tubes being substantially parallel to the axis of the duct, and a transition piece for delivering gas from the downstream ends of the flame tubes to the turbine nozzle, said transition piece including a truncated conical element extending from one of said walls to a point adjacent to the nozzle, a number of tube extensions which are substantially circular at their upstream ends and the shape of a sector of an annulus at their downstream ends, said extensions being secured together in a ring on one side of the conical element in side by side relation to define at their downstream ends a substantially annular opening corresponding in dimension to the nozzle, and means for securing said tube extensions to the nozzle ring on the side of the annular opening remote from the conical element, and a second truncated conical element located on the side of the ring of tube extensions remote from the first conical element, said second conical element being secured to the nozzle ring at the same point that the tube extensions are secured to the nozzle ring.

15. In a gas turbine power plant, a compressor, a turbine including a nozzle in the form of a ring, an annular duct having inner and outer walls and defining a path for gas from the compressor outlet to the turbine nozzle, a number of parallel substantially cylindrical flame tubes in said duct into which fuel is injected and in which the fuel mixed with the gas is burned, said tubes being substantially parallel to the axis of the duct, and a transition piece for delivering gas from the downstream ends of the flame tubes to the turbine nozzle, said transition piece including a truncated conical element extending from the inner wall of the duct to a point adjacent to the turbine nozzle, a number of tube extensions which are substantially cylindrical at their upper ends to receive the downstream ends of the flame tubes and which are the shape of a sector of an annulus at their downstream ends, said extensions being secured together in a ring on the outer side of the conical element in side by side relation to define a substantially annular opening corresponding in dimension to the nozzle, and a second truncated conical element surrounding the tube extensions and secured at its downstream end to the downstream end of the tube extensions.

16. In a gas turbine power plant, a compressor, a turbine including a nozzle in the form of a ring, an annular duct having inner and outer walls and defining a path for gas from the compressor outlet to the turbine nozzle, a number of parallel substantially cylindrical flame tubes in said duct into which fuel is injected and in which the fuel mixed with the gas is burned, said tubes being substantially parallel to the axis of the duct, and a transition piece for delivering gas from the downstream ends of the flame tubes to the turbine nozzle, said transition piece including a truncated conical element extending from the inner wall of the duct to a point adjacent to the turbine nozzle, a number of tube extensions which are substantially cylindrical at their upper ends to receive the downstream ends of the flame tubes and which are the shape of a sector of an annulus at their downstream ends, said extensions being secured together in a ring on the outer side of the conical element in side by side relation to define a substantially annular opening corresponding in dimension to the nozzle, and a second truncated conical element surrounding the tube extensions and secured at its downstream end to the downstream end of the tube extensions, the upstream end of said second conical element being in slidable engagement with the outer wall of the annular duct.

17. In a gas turbine power plant, a compressor, a turbine including a nozzle in the form of a ring, an annular duct having inner and outer walls and defining a path for gas from the compressor outlet to the turbine nozzle, a number of parallel substantially cylindrical flame tubes in said duct into which fuel is injected and in which the fuel mixed with the gas is burned, said tubes being substantially parallel to the axis of the duct, and a transition piece for delivering gas from the downstream ends of the flame tubes to the turbine nozzle, said transition piece including a truncated conical element extending from the inner wall of the duct to a point adjacent to the turbine nozzle, a number of tube extensions which are substantially cylindrical at their upper ends to receive the downstream ends of the flame tubes and which are the shape of a sector of an annulus at their downstream ends, said extensions being secured together in a ring on the outer side of the conical element in side by side relation to define a substantially annular opening corresponding in dimension to the nozzle, and a second truncated conical element surrounding the tube extensions and secured at its downstream end to the downstream end of the tube extensions, said second conical element being secured at its downstream end to the turbine nozzle.

18. In a gas turbine power plant, a compressor, a turbine including a nozzle in the form of a ring, an annular duct having inner and outer walls and defining a path for gas from the compressor outlet to the turbine nozzle, a number of parallel substantially cylindrical flame tubes in said duct into which fuel is injected and in which the fuel mixed with the gas is burned, said tubes being substantially parallel to the axis of the duct, and a transition piece for delivering gas from the downstream ends of the flame tubes to the turbine nozzle, said transition piece including a truncated conical element extending from the inner wall of the duct to a point adjacent to the turbine nozzle, a number of tube extensions which are substantially cylindrical at their upper ends to receive the downstream ends of the flame tubes and which are the shape of a sector of an annulus at their downstream ends, said extensions being secured together in a ring on the outer side of the conical element in side by side relation to define a substantially annular opening corresponding in dimension to the nozzle, and a second truncated conical element surrounding the tube extensions and secured at its downstream end to the downstream end of the tube extensions, the contacting walls of adjacent tube extensions being cut back in an upstream direction from the downstream ends of the conical rings to space these edges substantiallay from the nozzle ring.

19. A transition piece for a gas turbine power plant, said transition piece including a ring-shaped frusto-conical member, one end of which is smaller than the other, a plurality of duct extensions which are substantially cylindrical at one end and which converge to a segment shaped opening at the other end, said duct extensions being secured together to form a ring shape and said extensions being secured at their segment shaped ends to the smaller end of the ring-shaped member, the ring-shaped member surrounding and being substantially coextensive axially with said extensions.

20. A transition piece for a gas turbine power plant, said transition piece including a ring-shaped frusto-conical member, one end of which is smaller than the other, a plurality of duct extensions which are substantially cylindrical at one end and which converge to a segment shaped opening at the other end, said duct extensions being secured together to form a ring shape and said extensions being secured at their segment shaped ends to one end of the ring-shaped member, the latter being substantially coextensive axially with said extensions.

21. A transition piece for a gas turbine power plant, said transition piece including a ring-shaped frusto-conical member, one end of which is smaller than the other, a plurality of duct extensions which are substantially cylindrical at one end and which converge to a segment shaped opening at the other end, said duct extensions being secured together to form a ring shape and said extensions being secured at their segment shaped ends to the smaller end of the ring-shaped member, the ring-shaped member surrounding and being substantially coextensive axially with said extensions, said ring shaped member extending in diverging relation to the adjacent surfaces of the duct extensions from said smaller end.

22. A transition piece for a gas turbine power plant, said transition piece including a ring-shaped frusto-conical member, one end of which is smaller than the other, a plurality of duct extensions which are substantially cylindrical at one end and which converge to a segment shaped opening at the other end, said duct extensions being secured together to form a ring shape and said extensions being secured at their segment shaped ends to the smaller end of the ring-shaped member, the ring-shaped member surrounding and being substantially coextensive axially with said extensions and a second ring-shaped member within and surrounded by said duct extensions and secured to said duct extensions at their segment shaped ends.

23. A transition piece for a gas turbine power plant, said transition piece including a ring-shaped frusto-conical member, one end of which is smaller than the other, a plurality of duct extensions which are substantially cylindrical at one end and which converge to a segment shaped opening at the other end, said duct extensions being secured together to form a ring shape and said extensions being secured at their segment shaped ends to the smaller end of the ring-shaped member, the ring-shaped member surrounding and being substantially coextensive axially with said extensions and a second ring-shaped member within and surrounded by said duct extensions and secured to said duct extensions at their segment shaped ends, said second ring-shaped member extending in diverging relation to the adjacent surfaces of the duct extensions in a direction away from said segment-shaped ends.

References Cited in the file of this patent

UNITED STATES PATENTS

| Number | Name | Date |
|---|---|---|
| 2,445,661 | Constant et al. | July 20, 1948 |
| 2,479,573 | Howard | Aug. 23, 1949 |
| 2,494,821 | Lombard | Jan. 17, 1950 |
| 2,548,886 | Howard | Apr. 17, 1951 |
| 2,594,808 | Rubbra | Apr. 29, 1952 |
| 2,608,057 | Boyd et al. | Aug. 26, 1952 |
| 2,625,793 | Mierley et al. | Jan. 20, 1953 |